(12) United States Patent
Yang et al.

(10) Patent No.: US 7,158,595 B2
(45) Date of Patent: Jan. 2, 2007

(54) APPARATUS AND METHOD FOR ACQUIRING FRAME SYNCHRONIZATION IN A MOBILE COMMUNICATION SYSTEM

(75) Inventors: Kwang-Sung Yang, Songnam-shi (KR); Joon-Dong Lee, Kwacheon-shi (KR); Chul-Ho Jo, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 824 days.

(21) Appl. No.: 10/115,370

(22) Filed: Apr. 3, 2002

(65) Prior Publication Data

US 2002/0181634 A1 Dec. 5, 2002

(30) Foreign Application Priority Data

Apr. 14, 2001 (KR) ............................. 2001-20029

(51) Int. Cl.
*H04L 7/00* (2006.01)
(52) U.S. Cl. ...................... 375/356; 370/503; 714/758
(58) Field of Classification Search ................ 375/354, 375/148, 347, 142, 141, 140; 370/503, 335, 370/342, 329; 714/748, 775; 700/94; 455/69
See application file for complete search history.

(56) References Cited

U.S. PATENT DOCUMENTS 5,267,249 A * 11/1993 Dong ........................... 714/775
6,654,922 B1 * 11/2003 Numminen et al. ......... 714/748
6,721,299 B1 * 4/2004 Song ........................... 370/342
6,728,302 B1 * 4/2004 Dabak et al. ................ 375/148
6,745,013 B1 * 6/2004 Porter et al. .................. 455/69
6,791,960 B1 * 9/2004 Song ........................... 370/335
6,917,643 B1 * 7/2005 Imura ......................... 375/140
2001/0014113 A1 * 8/2001 Imura ......................... 375/141
2004/0022273 A1 * 2/2004 Jo et al. ...................... 370/503
2004/0210329 A1 * 10/2004 Chen et al. ................... 700/94
2004/0218563 A1 * 11/2004 Porter et al. ................ 370/329
2004/0252796 A1 * 12/2004 Dabak et al. ................ 375/347
2005/0018754 A1 * 1/2005 Song ........................... 375/142

* cited by examiner

*Primary Examiner*—Tesfaldet Brocure
*Assistant Examiner*—Sudhanshu C. Pathak
(74) *Attorney, Agent, or Firm*—The Farrell Law Firm (57) ABSTRACT

A method for acquiring frame synchronization of a broadcast channel (BCH) in an asynchronous mobile telecommunication system. The method according to the invention includes steps of acquiring a system timing through a synchronous channel (SCH), demodulating a primary common control physical channel (PCCPCH) based on the system timing, checking a cyclic redundancy check (CRC) by decoding a predetermined time interval of the demodulated PCCPCH, and acquiring frame synchronization of the BCH by reference to the CRC checked result.

12 Claims, 6 Drawing Sheets

FIG. 6

APPARATUS AND METHOD FOR ACQUIRING FRAME SYNCHRONIZATION IN A MOBILE COMMUNICATION SYSTEM

PRIORITY

This application claims priority to an application entitled "Apparatus and Method for Acquiring Frame Synchronization in Mobile Communication System" filed with the Korean Industrial Property Office on Apr. 14, 2001 and assigned Serial No. 2001-20029, the contents of which are hereby incorporated by reference.

BACKGROUND OF THE INVENTION

1. Field of the Invention

The present invention relates generally to an apparatus and a method for acquiring frame synchronization in a mobile communication system, and in particular, to an apparatus and a method for acquiring frame synchronization in an asynchronous mobile communication system.

To be specific, the present invention relates to an apparatus and a method for synchronizing a 20 msec frame of a broadcasting channel (BCH) in a primary common control physical channel (PCCPCH), which is a downlink common physical channel, by a user equipment (UE) in an asynchronous mobile communication system.

2. Description of the Related Art

The following is a description of a next generation asynchronous mobile telecommunication system made with reference to a universal mobile telecommunication system/ $3^{rd}$ generation partnership project (UMTS/3GPP).

To date, no specification of 3GPP has described acquiring frame synchronization of BCH, and no prior art specifically defines the same because it is a matter of embodiment. The following is a description of a process of synchronizing a 10 msec frame through initial cell detection by the UE in the asynchronous mobile communication system.

Figure 1:
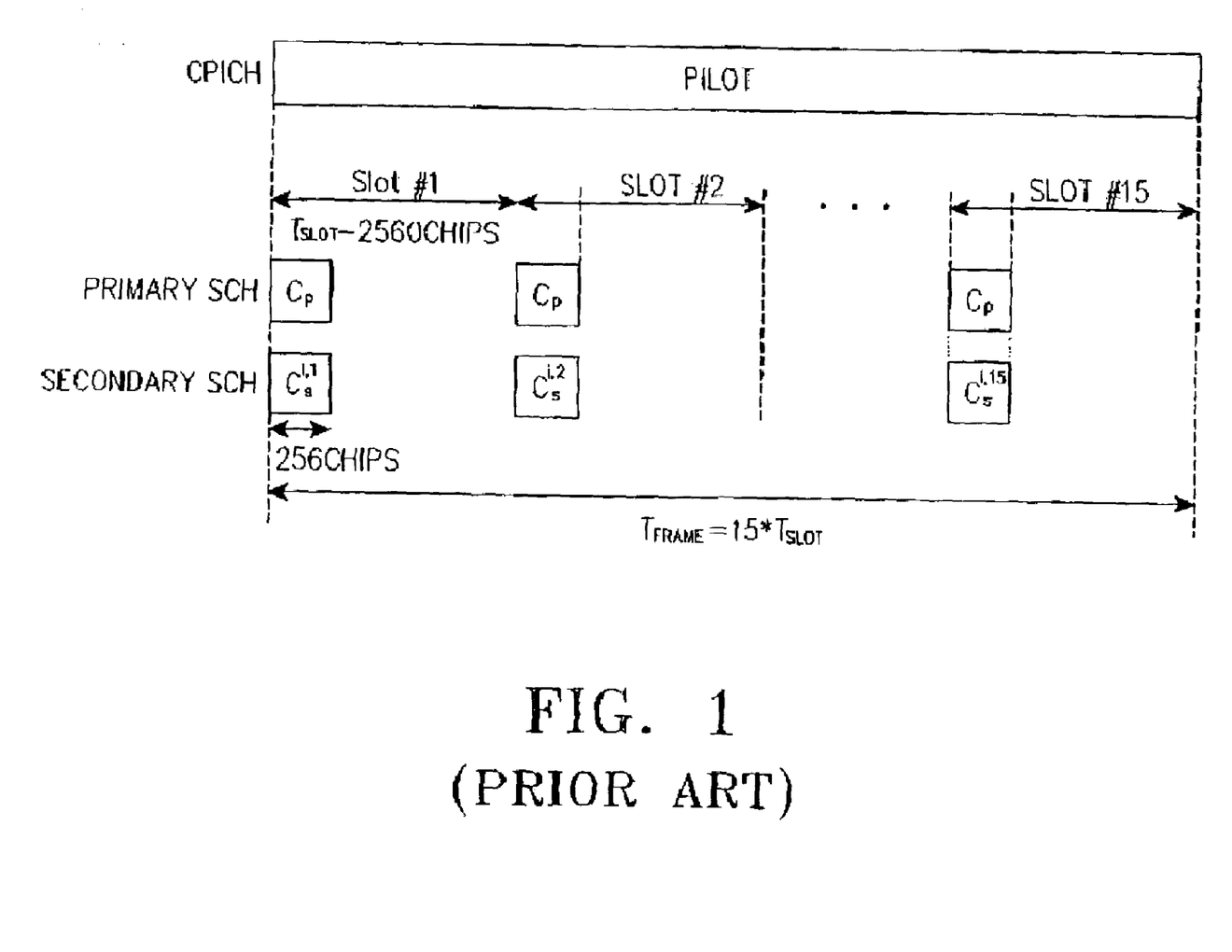
FIG. 1 is a diagram illustrating the structure of a PSH, a SSH, and a CPICH an asynchronous mobile telecommunication system.

FIG. 1 is a diagram illustrating the structure of a primary synchronization channel, a secondary synchronization channel, and a common pilot channel (CPICH). The Synchronization Channel (SCH) is a downlink signal used for cell search (first cell searching step). The SCH consists of two sub channels, the Primary and Secondary SCH. The 10 ms radio frames of the Primary and Secondary SCH are divided into 15 slots, each of length 2560 chips. The Primary SCH consists of a modulated code of length 256 chips, the Primary Synchronization Code (PSC) denoted $c_p$ in FIG. 1, transmitted once every slot. The PSC is the same for every cell in the system.

The Secondary SCH consists of repeatedly transmitting a length 15 sequence of modulated codes of length 256 chips, the Secondary Synchronization Codes (SSC), transmitted in parallel with the Primary SCH. The SSC is denoted $c_S^{i,k}$ in FIG. 1, where i=0, 1, . . . , 63 is the number of the scrambling code group, and k=1, 2, . . . , 15 is the slot number. Each SSC is chosen from a set of 16 different codes of length 256. This sequence on the Secondary SCH indicates which of the code groups the cell's downlink scrambling code belongs to. The UE, which has been synchronized with the time slot in the above first cell searching step, detects the code group data and a 10 msec frame synchronization through the secondary synchronization channels. Here, the code group data of the base station is the data determining a code group where the base station belongs, and is designated in accordance with a "comma free code" (second cell searching step).

Figure 2:
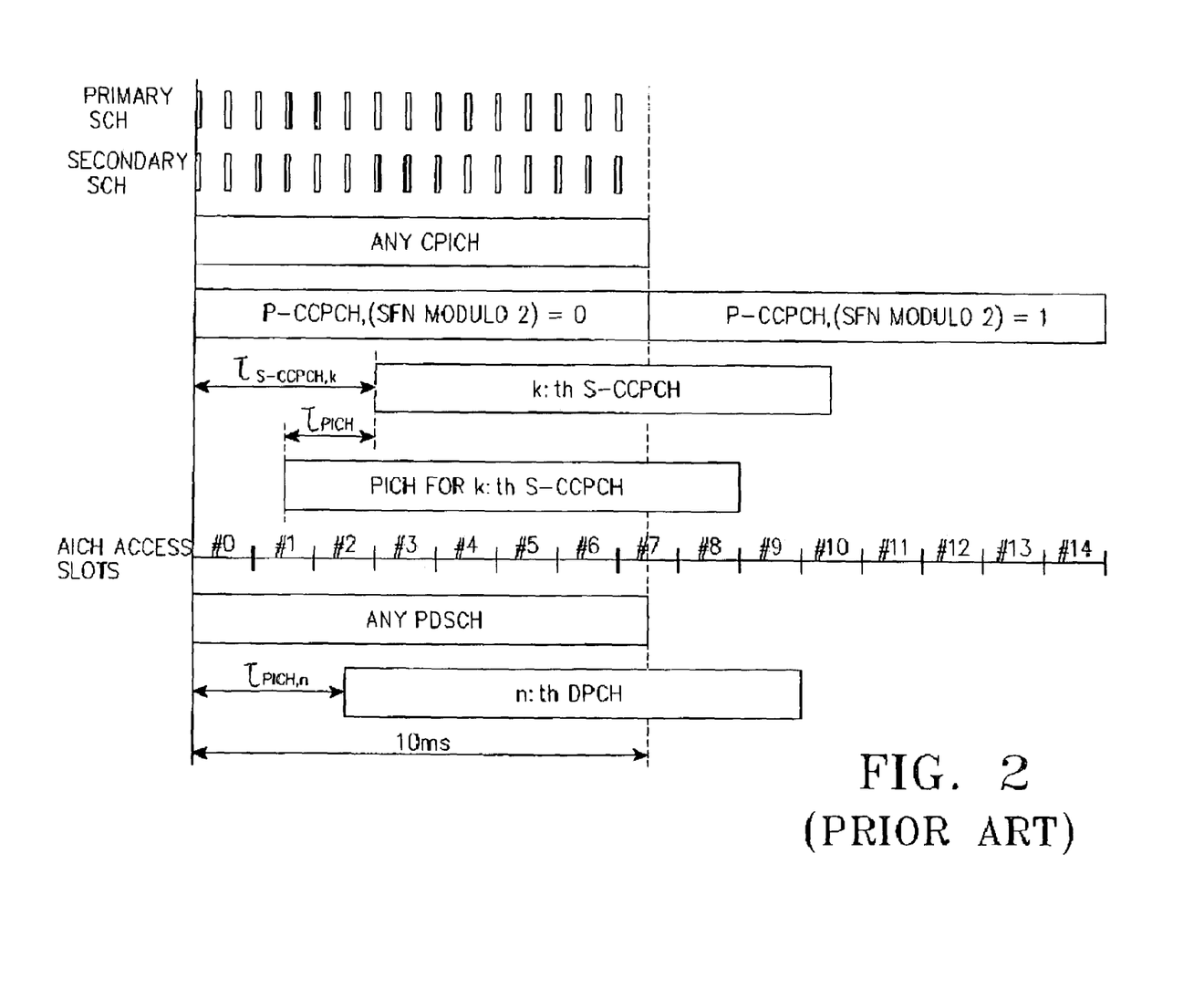
FIG. 2 is a diagram illustrating a frame timing relationship among downlink physical channels in a mobile telecommunication system.

FIG. 2 is a diagram illustrating a frame timing relationship among downlink physical channels in a mobile telecommunication system. The Primary CCPCH is a fixed rate (30 kbps, SF=256) downlink physical channels used to carry the BCH transport channel.

As described above, the UE synchronizes a 10 msec frame (or a system timing) through an initial cell search consisting of two steps. Thereafter, the UE needs to promptly decode a broadcasting channel (BCH) for prompt launch of the service. However, a 10 msec frame only has yet been synchronized at present, and no frame boundary has yet been known with respect to the 20 msec frame to decode the 20 msec BCH frame. Under these circumstances, if a radio frame of PCCPCH of a 10 msec unit is randomly decoded for 20 msec (=TTI of BCH) and uploaded to an upper layer, there is no guarantee that the 20 msec interval corresponds to the 20 msec boundary of the BCH. Therefore, if the first frame boundary is not matched, incorrect decoding data is consecutively uploaded on the upper layer. In other words, in order to promptly decode the BCH frame, it is necessary to upload the BCH frame data, which has been decoded without any errors, on the upper layer by acquiring a frame boundary of 20 msec BCH on a layer 1.

SUMMARY OF THE INVENTION

It is, therefore, an object of the present invention to provide an apparatus and a method for acquiring frame synchronization to enable a UE to promptly decode a BCH when searching cells in an asynchronous mobile telecommunication system.

It is another object of the present invention to provide an apparatus and a method for acquiring frame synchronization of a BCH when searching cells in an asynchronous mobile telecommunication system.

It is still another object of the present invention to provide an apparatus and a method for acquiring system data from a BCH, which is mapped with a PCCPCH, by enabling a UE to synchronize a frame of PCCPCH for 20 msec in an initial cell search in an asynchronous mobile telecommunication system.

To achieve the above objects of the present invention, there is provided a UE in an asynchronous mobile telecommunication system, comprising: a demodulator for demodulating a PCCPCH based on a timing acquired through a synchronous channel (SCH); and a controller for decoding demodulated data outputted from the demodulator for a predetermined time interval, checking a cyclic redundancy code (CRC), determining that the predetermined time interval corresponds to a frame interval of a BCH if the CRC checked result is positive, and determining that the predetermined time interval does not correspond to a frame interval of the BCH as much as a half of the frame interval thereof if the CRC checked result is negative.

According to another aspect of the present invention, there is provided a method for acquiring frame synchronization of a BCH in an asynchronous mobile telecommunication system, the method comprising the steps of: acquiring a system timing through a SCH; demodulating a PCCPCH based on the system timing; checking a CRC by decoding a predetermined time interval of the demodulated PCCPCH; determining that the predetermined time interval accords with a frame interval of a BCH if the CRC checked result is positive; and determining that the predetermined time interval discords with a frame interval of the BCH as much as a half of the frame interval thereof if the CRC checked result is negative.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention described herein below is directed to acquiring frame synchronization of a BCH for 20 msec, which is mapped with PCCPCH in layer 1 so as to decode the system data of the BCH as fast as possible. In other words, the present invention is directed to immediately acquiring frame synchronization (waiting 0 msec) when a result of checking a CRC of a transport block within a channel codec is positive (or, error free) and at most for 10 msec when the result thereof is negative (or, erroneous), excluding the processing time of 20 msec. The UE that has acquired frame synchronization acquires system data from the BCH, which is mapped with the PCCPCH.

FIG. 2 is a diagram illustrating a frame timing relationship among downlink physical channels. As shown in FIG. 2, SCHs (primary and secondary synchronization channels), a CPICH (common pilot channel), PCCPCH (primary common control physical channel) and a PDSCH have the same frame timing. Here, the SCHs and the CPICH are used for the initial cell search as described with reference to the related art.

Timing of a secondary common control physical channel (SCCPCH) may be different from that of the other SCCPCHs but has an offset of an integer times a length of 256 chips from the PCCPCH frame timing. For instance, $T_{S-CCPCH}$=Tk×256 chips, Tk∈{0, 1, ... , 149}. Timing of a paging indicator channel (PICH) precedes that of the SCCPCH frame for a predetermined period of time ($T_{PICH}$=7680 chips).

An access slot #0 of an acquisition indicator channel (AICH) starts at the same time as the PCCPCH frame, which has a "0" value in "SFN (system frame number) modulo 2". Fifteen access slots (#0~#14) exist in a single frame interval. Timing of the PDSCH is related to that of a dedicated physical channel (DPCH). The timing of the DPCH may be different from that of the other DPCHs but has an offset of an integer times a length of 256 chips from the PCCPCH frame timing. For instance, $T_{DPCH}$=Tn×256 chips, Tn∈{0, 1, ... , 149}.

The transport format characteristic of the BCH is as shown in Table 1 below.

TABLE 1

| | | |
|---|---|---|
| Dynamic Part | Transport Block Size | 246 |
| | Transport Block Set Size | 246 |
| Semi-Static Part | Transmission Time Interval (TTI) | 20 msec |
| | Type of Channel Coding | Convolutional Coding |
| | Code Rates | 1/2 |
| | CRC Size | 6 |

The UE receives downlink (or forward link) physical channels transmitted with the timing as shown in FIG. 2. The UE first acquires an initial synchronization (system timing of 10 msec) through the primary SCH, the secondary SCH and the CPICH, and performs a finger assignment and a set maintenance for tracking multi-paths through steady search of the CPICH. In other words, the UE acquires downlink synchronization with the base station. To promptly provide the UE user with services under these circumstances, it is necessary to acquire cell specific information as soon as possible. Such information is included in the broadcast channel (BCH). In other words, the UE is synchronized with timing of the forward link through the broadcast channel, and acquires information related to a reverse common channel or the CPCH (common packet channel). The information related to the reverse common channel include scrambling codes and number of signatures, AICH timing of forward link, etc. Meanwhile, the broadcast channel is loaded on the PCCPCH. Accordingly, the UE decodes the PCCPCH radio frame for 20 msec (=TTI of BCH) consecutively, and uploads the same on the upper layer.

Figure 3:
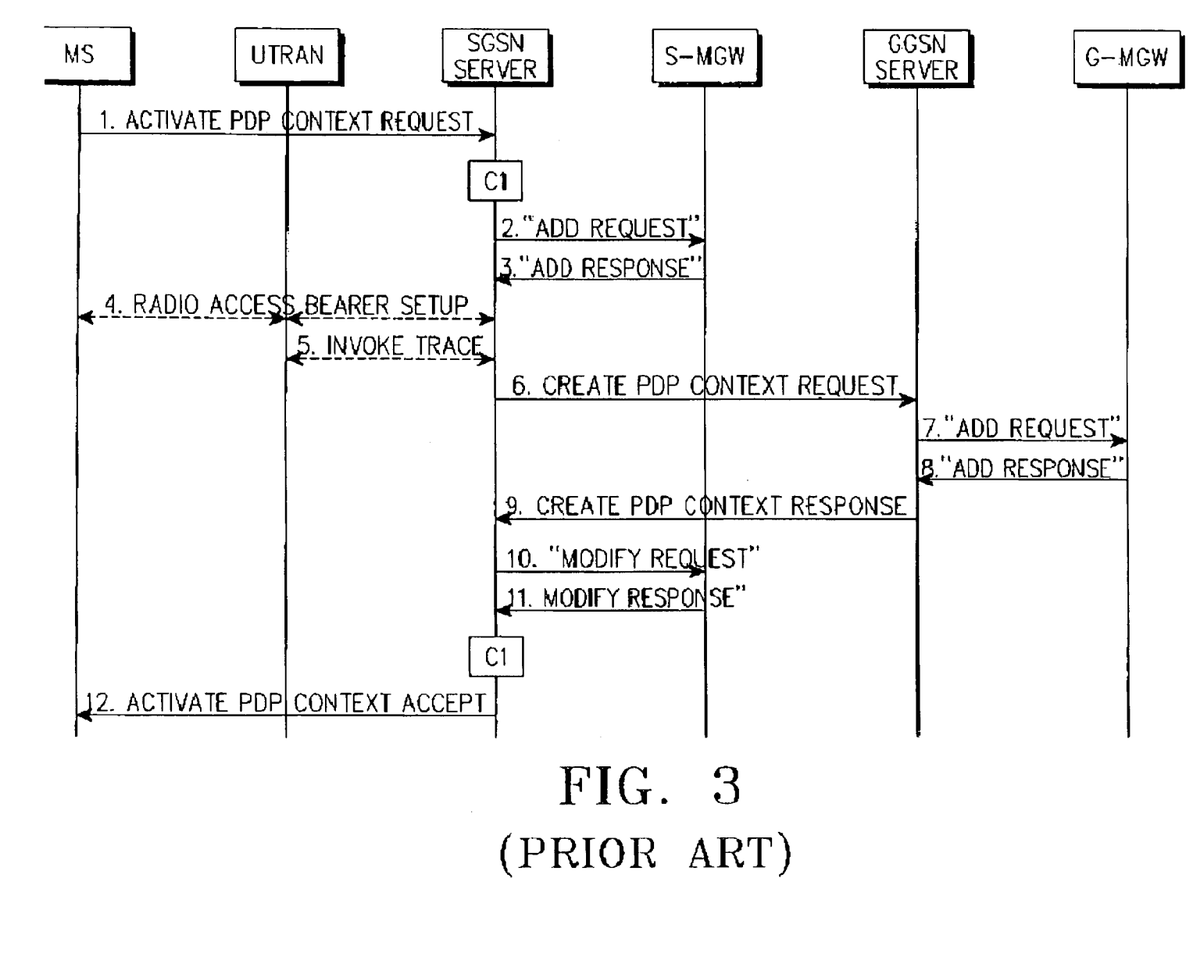
FIG. 3 is a diagram illustrating a timing relationship between a transmitting side and a receiving side of the downlink PCCPCH.

However, the synchronization acquired through two-step cell searches is the 10 msec frame synchronization in the physical channel. This means that the UE is unable to recognize the 20 msec boundary of the BCH transmitted from UTRAN (UMTS Terrestrial Radio Access Network or a base station) through two-step cell searches. FIG. 3 shows such a state. In FIG. 3, #0 refers to a first frame corresponding to the first 10 msec interval of the 20 msec frame of the BCH, while #1 refers to a second frame corresponding to the remaining interval.

In FIG. 3, the UE in "Case 1)" continuously decodes the BCH under a discordant state of the 10 msec frame boundary. As a consequence, incorrect data values are loaded on the upper layer. The UE in "Case 2)" can correctly decode the BCH frame of the UTRAN.

Since the BCH consists of a single transport (TTI) block as shown in the Table 1 above, the transmitting party adds the CRC to the end of the TTI block for 20 msec. Therefore, when the frame is discordant in the receiving party as in "Case 1)", CRC errors occur. In the "Case 2)", correct CRC is checked.

Figure 4:
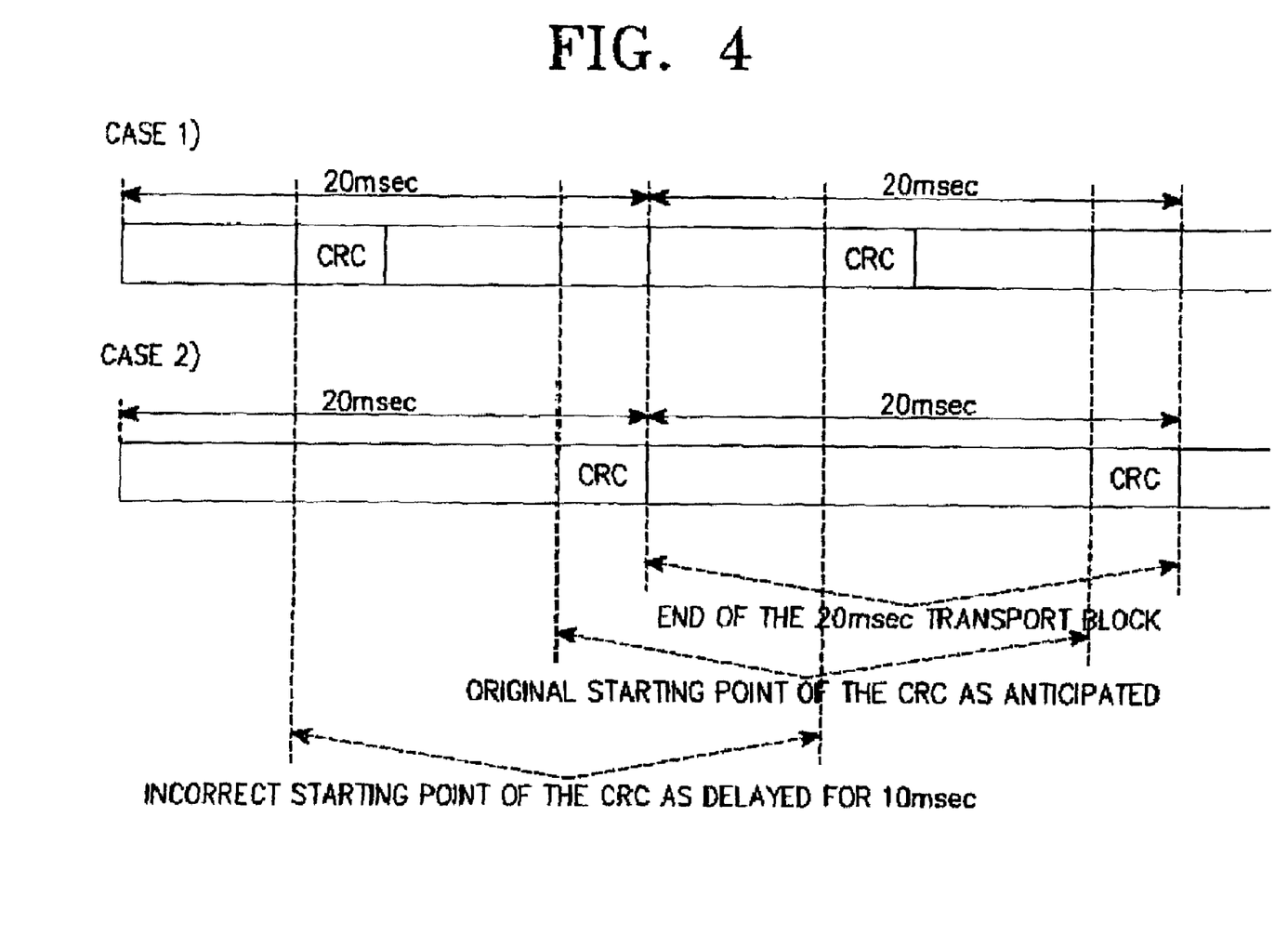
FIG. 4 is a diagram illustrating positions of transport blocks of BCH and CRC.

FIG. 4 shows the above two states in detail. As shown in FIG. 4, "Case 1)" illustrates how CRC errors occur due to discordance of the decoding interval of 20 msec with the TTI block. "Case 2)" shows that the CRC checking is positively passed because the decoding interval of 20 msec accords with the transport block of the BCH. Therefore, according to the present invention, the radio frame of the BCH for 20 msec is first decoded, and frame synchronization is acquired if the CRC checked result is positive. If negative or erroneous, the following frame synchronization is checked from the fourth frame (not third frame) (refer to FIG. 4) because the first frame and the second frame are the frames that have been consumed to decode the CRC of the TTI block and third frame is considered to be a second frame of 20 msec TTI block of the BCH, and thus, decoding is performed at intervals of 20 msec from the fourth frame, i.e. after 30 msec. Of course, the channel measurement occurs through another channel, and the PCCPCH needs to be maintained to be a decodable channel.

Figure 5:
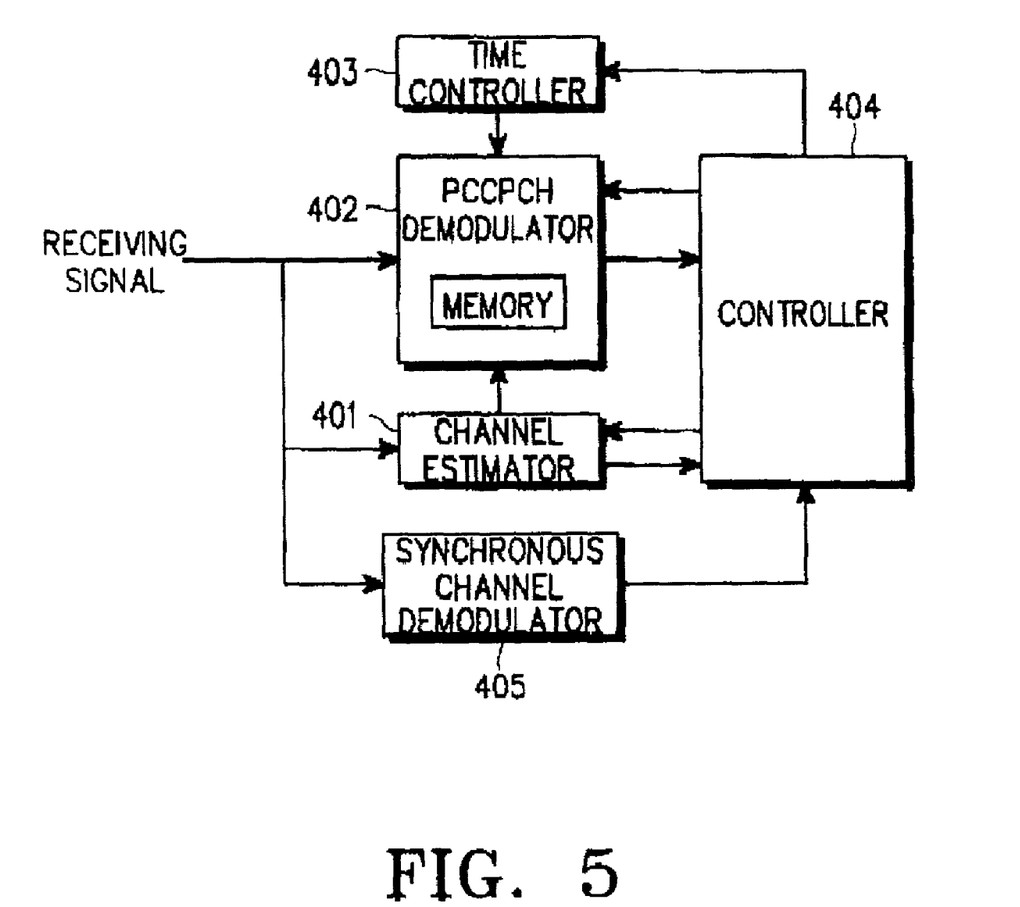
FIG. 5 is a block diagram illustrating an apparatus for acquiring frame synchronization in an asynchronous mobile telecommunication according to an embodiment of the present invention.

FIG. 5 is a block diagram illustrating an apparatus for acquiring frame synchronization in an asynchronous mobile telecommunication system according to an embodiment of the present invention. Referring to FIG. 5, a channel estimator 401 of UE estimates fading components of a downlink by demodulating the common pilot channel. A SCH demodulator 405 acquires 10 msec frame synchronization and code group data through the initial cell searching process so as to provide the same with a controller 404. A PCCPCH demodulator 402 comprises a memory for processing received signals in an offline manner. The PCCPCH demodulator 402 demodulates the interval of 20 msec on the PCCPCH under the control by a time controller 403 by means of a fading coefficient provided by the channel estimator 401. The time controller 403 controls the demodulating interval of the PCCPCH demodulator 402 under the control of the controller 404. The controller 404 provides the timing (10 msec frame synchronization) acquired through the initial cell search with the time controller 403 so that the time controller 403 can control the demodulating interval of the PCCPCH demodulator 402. The controller 404 demodulates an output of the PCCPCH demodulator 402 to check the CRC, and determines whether or not the 20 msec frame synchronization has been acquired based on the checked result. If the CRC checked result is positive, the frame synchronization is considered to have been acquired, and the PCCPCH is continuously decoded at intervals of 20 msec so as to be transferred to an upper layer. If the CRC checked result is negative, the 20 msec frame boundary is considered to be discordant. Then, the 10 msec interval after the above 20 msec demodulating interval, is discarded. The PCCPCH is decoded at intervals of 20 msec thereafter so as to be transferred to the upper layer.

Figure 6:
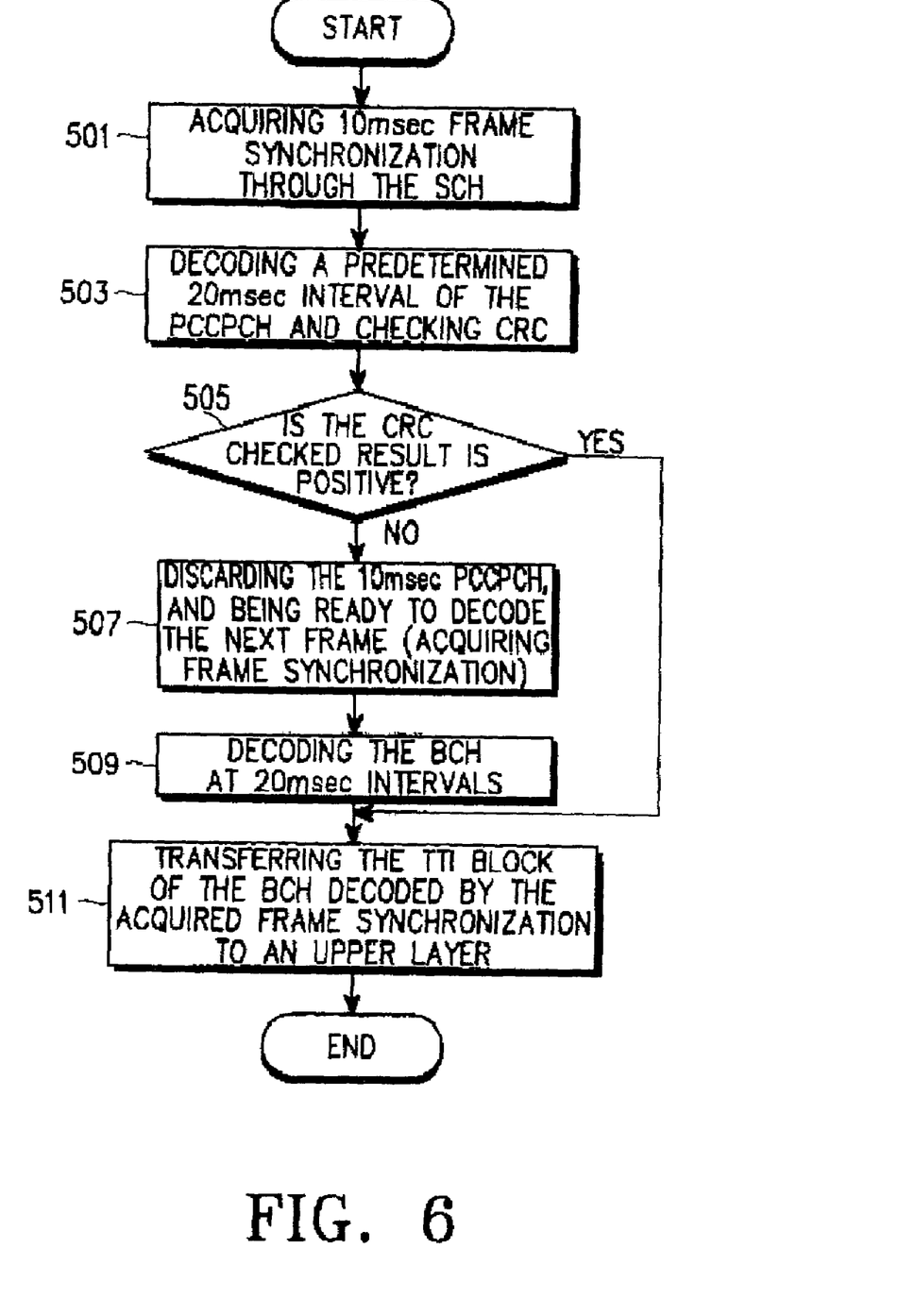
FIG. 6 is a flow chart illustrating a process of acquiring frame synchronization in an asynchronous mobile telecommunication system according to an embodiment of the present invention.

FIG. 6 is a flow chart illustrating a process of acquiring frame synchronization in an asynchronous mobile telecommunication system according to an embodiment of the present invention. Referring to FIGS. 5 and 6, the UE demodulates the primary SCH and the secondary SCH to acquire 10 msec frame synchronization in step 501. Here, the demodulation of the primary SCH and the secondary SCH is performed by the SCH demodulator 405. Thereafter, the PCCPCH demodulator 402 demodulates the received signals based on the acquired 10 msec frame synchronization so as to be transferred to the controller 404. The controller 404 then decodes the output of the PCCPCH demodulator 402 at a random 20 msec interval in step 503 to check the CRC. In other words, the controller 404 performs decoding under an assumption that two random radio frames on the PCCPCH are BCH frames of 20 msec TTI. The controller 404 determines whether or not the CRC checked result is positive in step 505. If positive, step 511 is proceeded with. If negative, step 507 is proceeded with. Here, if the 20 msec interval is the radio frame interval of the BCH, the CRC checking will be positive. Otherwise, errors would occur in the CRC checking.

If any errors have occurred in the CRC checking, the controller 404 discards the 10 msec frame of the PCCPCH after the decoding interval in step 507, and is ready to decode the next frame. In other words, the next frame is determined to be the first frame of the 20 msec TTI block of the BCH. This means that the 20 msec frame synchronization has been acquired. The controller 404 decodes the next frame (or the BCH frame) at intervals of 20 msec in step 509, and transfers the TTI block of the BCH decoded by the acquired 20 msec frame synchronization to an upper layer in step 511. The BCH data is steadily loaded on the upper layer from layer 1 in conformity with the acquired timing. Here, the assumption is that the channel measurement is performed by another channel, and the PCCPCH should be maintained as a decodable channel. Such a frame synchronizing process is not taken for each frame but is taken when first acquiring BCH system data on the PCCPCH after the initial cell search or under a handoff state.

As described above, the 20 msec frame synchronization of the BCH is acquired based on the CRC checked result for a predetermined demodulating interval of the PCCPCH. If the CRC checked result is positive, the frame synchronization is considered to have been acquired, so that the PCCPCH is consecutively decoded at intervals of 20 msec and is transferred to the upper layer. If negative, the 20 msec frame boundary is considered to be discordant. Then, the 10 msec interval after the 20 msec demodulating interval is discarded. The PCCPCH is decoded at intervals of 20 msec thereafter so as to be transferred to the upper layer.

As described above, the present invention is capable of acquiring frame synchronization of the BCH in a prompt and precise manner when acquiring an initial synchronization by a terminal in a UMTS, which is a next generation asynchronous mobile telecommunication system. As a consequence, unnecessary signaling with an upper layer that might occur when failing the frame synchronization can be removed, and the time consumed for acquiring a system can also be shortened. As a consequence, prompt services can be provided for the user.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for acquiring frame synchronization in an asynchronous mobile telecommunication system, comprising:
    a demodulator for demodulating a primary common control physical channel (PCCPCH) based on a timing acquired through a synchronization channel (SCH); and
    a controller for decoding demodulated data outputted from the demodulator for a predetermined time interval, checking a cyclic redundancy check (CRC), and acquiring frame acquisition of a broadcast channel (BCH) by reference to the CRC checked result,
    wherein the controller determines that the predetermined time interval does not correspond to a frame interval of the broadcast channel (BCH) for as much as a half of the frame interval thereof when the cyclic redundancy check (CRC) checked result is negative.

2. The apparatus of claim 1, wherein the controller determines that the predetermined time interval corresponds to a frame interval of the BCH when the cyclic redundancy check (CRC) checked result is positive.

3. The apparatus of claim 1, wherein the predetermined time interval is 20 msec.

4. An apparatus for acquiring frame synchronization in an asynchronous mobile telecommunication system, comprising:
- a demodulator for demodulating a primary common control physical channel (PCCPCH) based on a timing acquired through a synchronization channel (SCH); and
- a controller for decoding demodulated data outputted from the demodulator for a predetermined time interval, checking a cyclic redundancy check (CRC), determining that the predetermined time interval corresponds to a frame interval of a broadcast channel (BCH) when the cyclic redundancy check (CRC) checked result is positive, and determining that the predetermined time interval does not correspond to a frame interval of the broadcast channel (BCH) for as much as a half of the frame interval thereof when the cyclic redundancy check (CRC) checked result is negative.

5. The apparatus of claim 4, wherein the predetermined time interval is 20 msec.

6. A method for acquiring frame synchronization of a broadcast channel (BCH) in an asynchronous mobile telecommunication system, comprising the steps of:
- acquiring a system timing through a synchronization channel (SCH);
- demodulating a primary common control physical channel (PCCPCH) based on the system timing;
- checking a CRC by decoding a predetermined time interval of the demodulated primary common control physical channel (PCCPCH);
- acquiring frame synchronization of the broadcast channel (BCH) by reference to the cyclic redundancy check (CRC) checked result; and
- determining that the predetermined time interval does not correspond to a frame interval of the broadcast channel (BCH) for as much as a half of the frame interval thereof, when the CRC checked result is negative.

7. The method of claim 6, wherein the predetermined time interval is 20 msec.

8. The method of claim 6, further comprising the step of determining that the predetermined time interval corresponds to a frame interval of the broadcast channel (BCH) when the cyclic redundancy check (CRC) checked result is positive.

9. The method of claim 6, wherein the system timing is a 10 msec frame synchronization.

10. A method for acquiring frame synchronization of a broadcast channel (BCH) in an asynchronous mobile telecommunication system, comprising the steps of:
- acquiring a system timing through a SCH;
- demodulating a PCCPCH based on the system timing;
- checking a cyclic redundancy check (CRC) by decoding a predetermined time interval of the demodulated primary common control physical channel (PCCPCH);
- determining that the predetermined time interval corresponds to a frame interval of the broadcast channel (BCH) when the CRC checked result is positive; and
- determining that the predetermined time interval does not correspond to a frame interval of the broadcast channel (BCH) for as much as a half of the frame interval thereof, when the cyclic redundancy check (CRC) checked result is negative.

11. The method of claim 10, wherein the system timing is a 10 msec frame synchronization.

12. The method of claim 10, wherein the predetermined time interval is 20 msec.

* * * * *